(12) United States Patent
Braunlich et al.

(10) Patent No.: US 8,256,601 B2
(45) Date of Patent: Sep. 4, 2012

(54) SPRUNG ANTI-BACKING-OFF DEVICE

(75) Inventors: Thomas Braunlich, Gonesse (FR);
Hervé Leroy, Gonesse (FR); Etienne Bernard, Gonesse (FR)

(73) Assignee: Bernard Controls, Gonesse (FR)

( * ) Notice: Subject to any disclaimer, the term of this patent is extended or adjusted under 35 U.S.C. 154(b) by 859 days.

(21) Appl. No.: 12/282,040

(22) PCT Filed: Mar. 8, 2007

(86) PCT No.: PCT/FR2007/000416
§ 371 (c)(1),
(2), (4) Date: Jan. 23, 2009

(87) PCT Pub. No.: WO2007/101947
PCT Pub. Date: Sep. 13, 2007

(65) Prior Publication Data
US 2010/0006389 A1    Jan. 14, 2010

(30) Foreign Application Priority Data
Mar. 8, 2006    (FR) ...................................... 06 02066

(51) Int. Cl.
*F16D 41/20* (2006.01)
(52) U.S. Cl. ................... 192/223.4; 192/81 C; 192/95; 251/129.03
(58) Field of Classification Search ................ 192/41 S, 192/81 C, 223.4; 251/129.03; 74/625
See application file for complete search history.

(56) References Cited

U.S. PATENT DOCUMENTS

| | | | | |
|---|---|---|---|---|
| 2,571,232 A * | 10/1951 | Gorske | ........................ | 192/41 S |
| 3,150,750 A * | 9/1964 | Georges | ........................ | 192/38 |
| 3,930,566 A * | 1/1976 | Matsushima | .............. | 192/223.4 |
| 4,194,605 A * | 3/1980 | Sessa | ........................ | 192/12 R |
| 4,257,500 A * | 3/1981 | Brunner | ........................ | 192/35 |
| 4,295,552 A * | 10/1981 | Erlach | ........................ | 192/81 C |
| 4,546,671 A * | 10/1985 | Fry | ........................ | 74/625 |
| 4,651,854 A * | 3/1987 | Harada | ........................ | 192/223.4 |
| 5,031,745 A * | 7/1991 | Nishimura | ................. | 192/84.81 |
| 5,058,720 A * | 10/1991 | Rude et al. | ................... | 192/41 S |
| 5,135,086 A * | 8/1992 | Ciolli | ........................ | 192/48.3 |
| 5,195,721 A * | 3/1993 | Akkerman | ............... | 251/129.13 |
| 5,295,907 A * | 3/1994 | Akkerman | ....................... | 464/37 |
| 6,073,907 A * | 6/2000 | Schreiner et al. | ......... | 251/129.12 |
| 6,877,597 B2 * | 4/2005 | Bach et al. | ................. | 192/223.4 |
| 2003/0178276 A1 * | 9/2003 | Fraczek et al. | ............... | 192/3.52 |

FOREIGN PATENT DOCUMENTS

| | | |
|---|---|---|
| DE | 3211506 | 10/1983 |
| DE | 10110034 | 9/2002 |

(Continued)

*Primary Examiner* — David D Le
*Assistant Examiner* — Lillian Nguyen
(74) *Attorney, Agent, or Firm* — Merchant & Gould

(57) ABSTRACT

The invention relates to a mechanical sprung anti-backoff device, capable of fixedly immobilizing or releasing a manual control handwheel (4) and a motor acting on one and the same rotation shaft, comprising a cylindrical spring (7, 16), a cylinder (9, 17) mounted so as to rotate on the rotation shaft, the spring being able to rotate with the cylinder, turns of the spring being in contact with a surface of the cylinder and its ends being capable of coming into contact with the handwheel. The ends of the spring (7, 16) are curved inward or outward, the handwheel (4) may act on the curve of one or other of the ends of the spring (7, 16), and the rotation of the spring (7, 16) is limited by a stop acting against one or other of the ends of the spring. Application can be to manual control and motorized control valves, for example on fluid pipes.

14 Claims, 3 Drawing Sheets

FOREIGN PATENT DOCUMENTS

Figure 1:
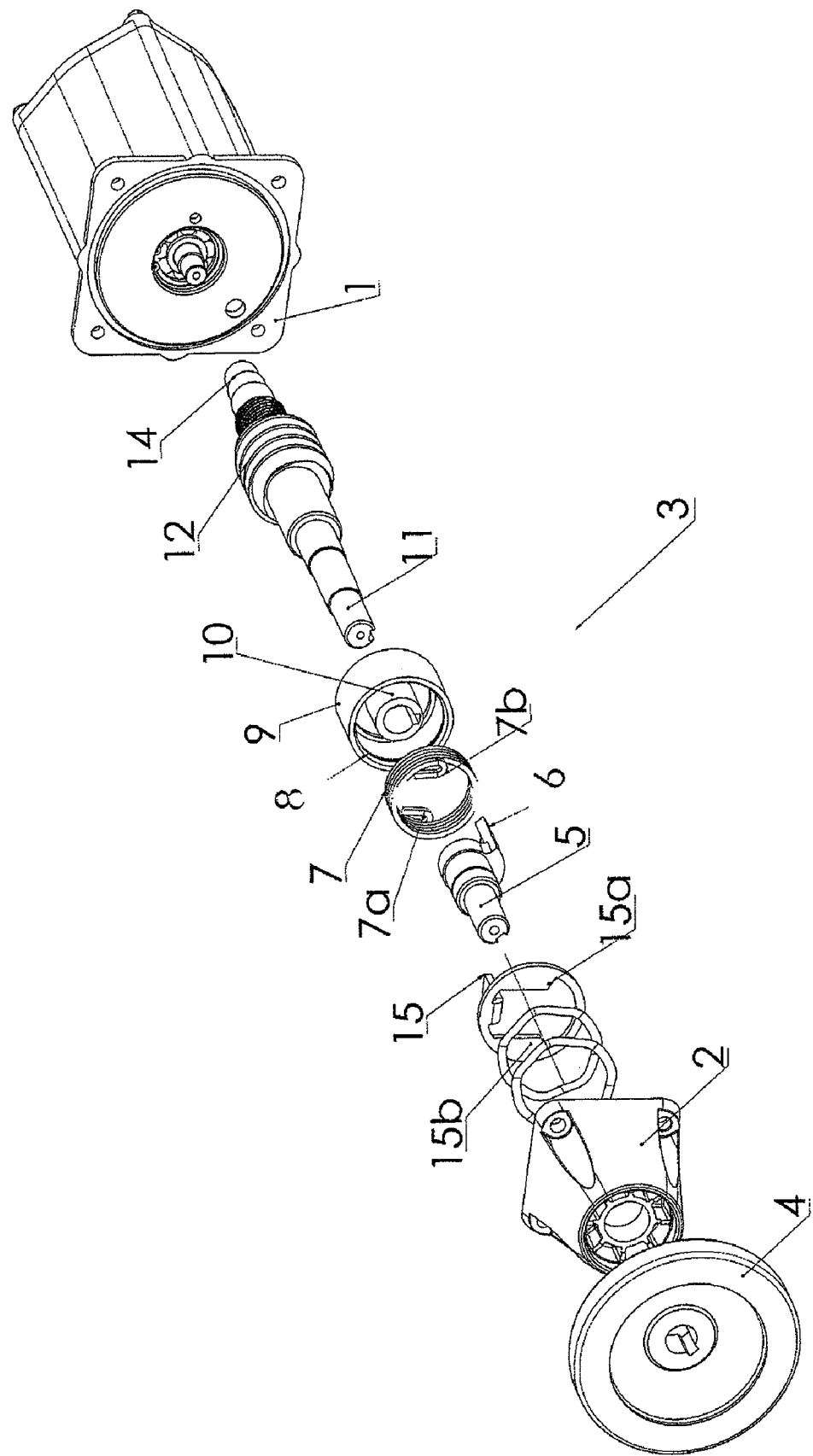

| | | |
|---|---|---|
| EP | 0368526 | 5/1990 |
| EP | 0717166 | 6/1996 |
| GB | 2211565 | 7/1989 |
| JP | 62077247 A * | 4/1987 |

* cited by examiner

SPRUNG ANTI-BACKING-OFF DEVICE

The present invention relates to a mechanical anti-backoff device, and more particularly to a mechanical sprung anti-backoff device adapted to a mechanism making it possible to move from one extreme position to another, such as a valve, a sliding lock paddle or a tap with manual or motorized controls, providing better security of the valve control.

Mechanical non-return, torque-limiting and anti-backoff devices are used in various technical fields in particular in order to perform a safety function by preventing or limiting the rotation of a shaft, for example in order to prevent the rotation of the manual control handwheel of a valve comprising both a manual control and a servomotor, or in operating controls of doors or else in window-winding devices in order to ensure safety against accidental trapping. In particular, in the oil industry or in the treatment of water, vapors and gases, valves, taps and sliding lock paddles are used to close or open pipes, which may be actuated by manual or motorized controls operating in environments that may be open or confined. Usually, the valve is controlled by a servomotor, and a manual control by means of a handwheel and a reduction gear allows operation in the event of disconnection of the electric supply of the servomotor or in the event of defective control, so that it is possible to adjust the positioning of the valve between the extreme open and closed positions.

The presence of a manual control and a motorized control on one and the same valve imposes the need to provide a safety device in order to prevent for example the accidental actuation of the handwheel of the manual control from interfering with the operation of the motorized control. It is also necessary to ensure that the manual control can be used normally in total safety when necessary.

Accordingly, devices are known for the releasing of the manual drive of the valve shaft, or mechanical torque-limiting, non-return or anti-backoff mechanical devices, particularly devices with ratchets or rollers. For example, patent FR 2.816.016 describes a sprung torque-limiting device for roller blinds sensitive to the direction of rotation. The known devices are often relatively complex and comprise a large number of mechanical parts, whereof the mounting usually requires good precision, which may complicate their maintenance and harm their reliability.

It is therefore desirable to be able to have a reliable device providing good security of operation.

The subject of the present invention is precisely a low-cost mechanical anti-backoff device which is easy to mount and provides good reliability of operation, particularly on valves comprising a motorized control and a manual control.

A further subject of the invention is a sprung anti-backoff device providing the release of the manual control of a motorized valve.

A further subject of the present invention is a sprung anti-backoff device allowing the transmission of an identical torque irrespective of the direction of rotation of the manual control.

A further subject of the invention is a motorized system with manual control which comprises a mechanical anti-backoff device according to the invention, and in particular such a system in which the rotation shaft of the anti-backoff device acts on the opening and closing movement of a valve.

The sprung anti-backoff device of the present invention is capable of fixedly immobilizing or releasing a manual control handwheel and a motor acting on one and the same rotation shaft. It comprises a cylindrical spring, preferably a cylindrical spring with touching turns, mounted in or on a cylinder, said cylinder being mounted so as to rotate on the rotation shaft of said motor, and said spring being able to rotate with said cylinder, the turns of the spring being in contact with the inner or outer surface of the cylinder and its ends being capable of coming into contact with said handwheel, and it is remarkable in that the ends of the cylindrical spring are curved inward or outward, said handwheel, for example a manual control handwheel of a valve, being capable of acting on the curve of one or other of the ends of the spring by means of an operating finger or of a drive cylinder, and the rotation of the spring being limited by a stop acting against one or other of the ends of the spring.

In such a device, the spring transmits the movement between the motor and the handwheel, as will emerge from the description of the figures below.

According to a preferred embodiment, the two ends of the spring are curved inward, and situated substantially symmetrically on either side of a diametral plane of the spring. Preferably, they are placed relative to one another such that the diametral planes tangential to the curve of each of the two ends of the spring form between them an angle lying between 90° and 180°, in which the operating finger takes position, which enters the inside of the cylindrical spring, over the whole of its height, in order to be able to act on one or other of its ends, while a release plate clamped onto the bearing of the manual control handwheel is placed substantially symmetrically relative to the shaft.

According to a variant, the two ends of the cylindrical spring are curved outward and the spring is mounted on a cylindrical support situated in a cylinder having two stops interacting with the outside of the curve of each of the curved ends of the spring, such that a relative rotary movement of the spring relative to the cylindrical support generates on one or the other of the ends of a spring a torque opposite to the winding of the turns and tending to cause an increase in its diameter.

In the two variants, the ends of the cylindrical spring are curved so as to form a closed loop, the ridge of the end coming into contact with the turn, in order to limit the risk of deformation or of breakage during operation.

The cylindrical spring used in the present invention is preferably a spring with touching turns, with a round or square section, and preferably square, made of a material having an appropriate stiffness, for example of steel, more particularly of C60 steel.

It is preferable that the diameter of the spring under no load is approximately 2% greater than the internal diameter of the cylinder in which it is housed, or 2% less than the external diameter of the cylinder on which it is mounted, according to the variants of the anti-backoff device of the invention, in order to ensure a good contact between the turns of the spring and the corresponding surface of the cylinder. For the same reason, it is necessary for the length of the turns to be sufficient, and for example, according to the envisaged applications, it may be between 100 mm and 1000 mm, and may be for example of the order of 500 mm in the case of an anti-backoff device for a valve.

The arrangement of the device makes it possible to support high rotation speeds, lying between approximately 75 and approximately 150 revolutions per minute, and major differences of rotation speed between the manual control handwheel and the rotation shaft of the motor, which is an additional advantage of the present invention.

The mechanical anti-backoff device of the invention may be used in any mechanism comprising a rotating manual or motorized control shaft capable of passing from an open position to a closed position and vice versa, and for example a valve control, a door control or else a motor vehicle door window-winder. It applies most particularly to valve controls, for example quarter-turn valves or multiturn valves used in installations comprising fluid pipes such as oil, water, vapors or various gases.

The mechanical anti-backoff device of the invention may be inserted into a mechanism comprising a valve control shaft, rotated manually and by a servomotor, the valve stem being kinematically connected via a reduction gear and/or a gear/worm assembly.

Therefore, in the case of a valve control, it is advantageous to provide that the manual control can act on one or other of the curved ends of the cylindrical spring, by exerting a torque against the direction of winding of the turns, so as to cause an enlargement of the spring when the latter is in the cylinder connected to the valve stem, or on the contrary in the direction of winding of the turns when the spring is on the cylinder. In both cases the actuation of the manual control has the effect of immobilizing the cylindrical spring with the cylinder kinematically connected to the valve stem. Conversely, a rotation of the motor has the effect of releasing the cylindrical spring from the cylinder, irrespective of the direction of rotation, and therefore of releasing the manual control handwheel.

The sprung anti-backoff device of the present invention has the advantage, particularly in its application to motorized control and manual control valves, of effectively ensuring the release of the manual control without the trapping risks inherent in conventional systems with rollers. In addition, the number of parts constituting the anti-backoff device of the invention is limited to three or four while the conventional systems use 15 to 20. The mounting time is therefore considerably diminished.

The anti-backoff device of the invention also has the advantage of being able to transmit an identical torque to the worm connected to the valve stem, irrespective of the direction of rotation of the manual control handwheel of the valve, and also of allowing the rotation of the worm under the action of a drive motor, without causing the manual control handwheel to turn, which makes it possible to ensure the safety of the operator.

The features and advantages of the present invention will appear in greater detail in the following description relating to two preferred exemplary embodiments, with reference to the appended drawings which represent:

FIG. 1: an exploded view in perspective of an anti-backoff device according to the invention mounted between a motor and a manual handwheel for the control of a valve.

Figure 2:
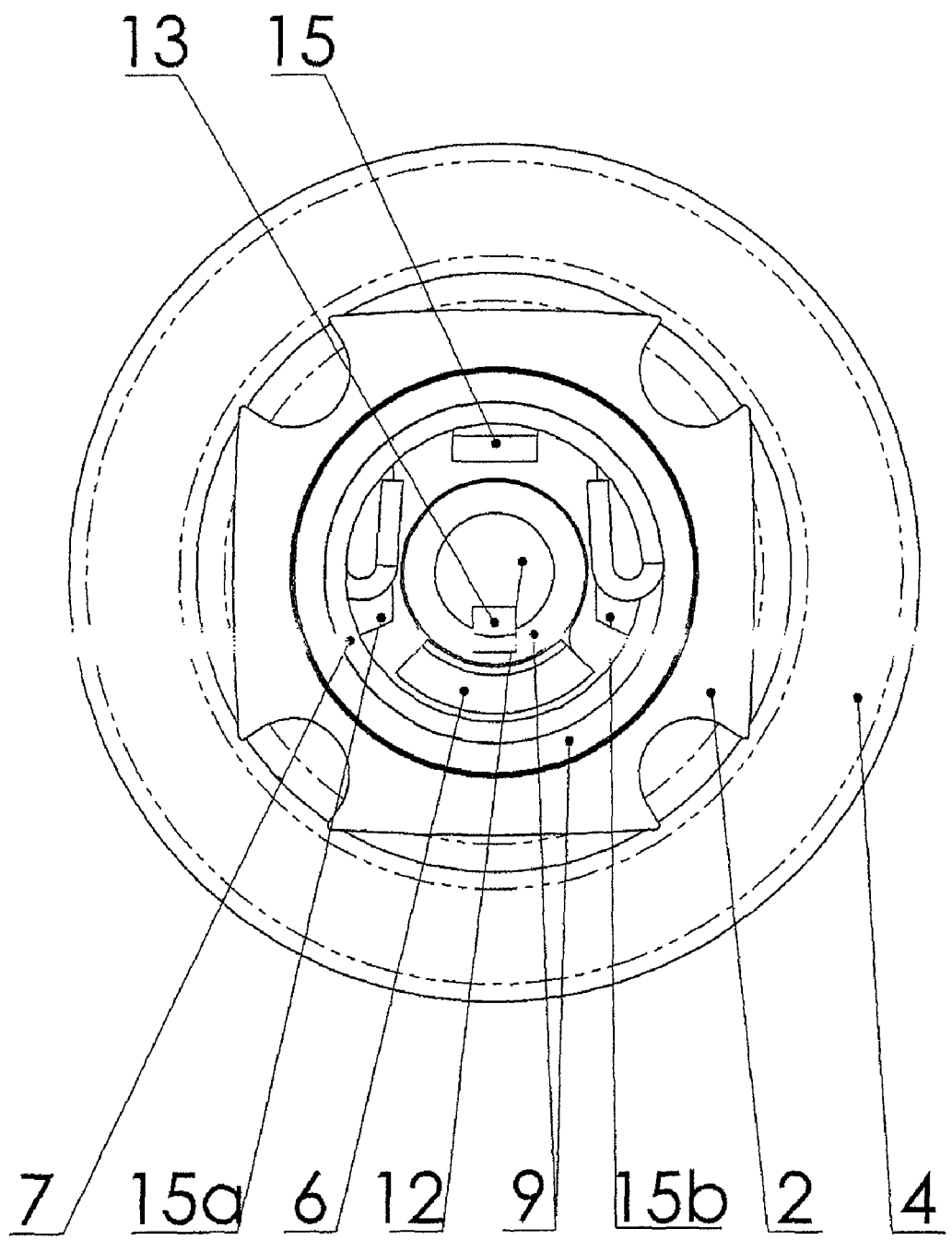

FIG. 2: an axial section of the anti-backoff device of FIG. 1.

Figure 3:
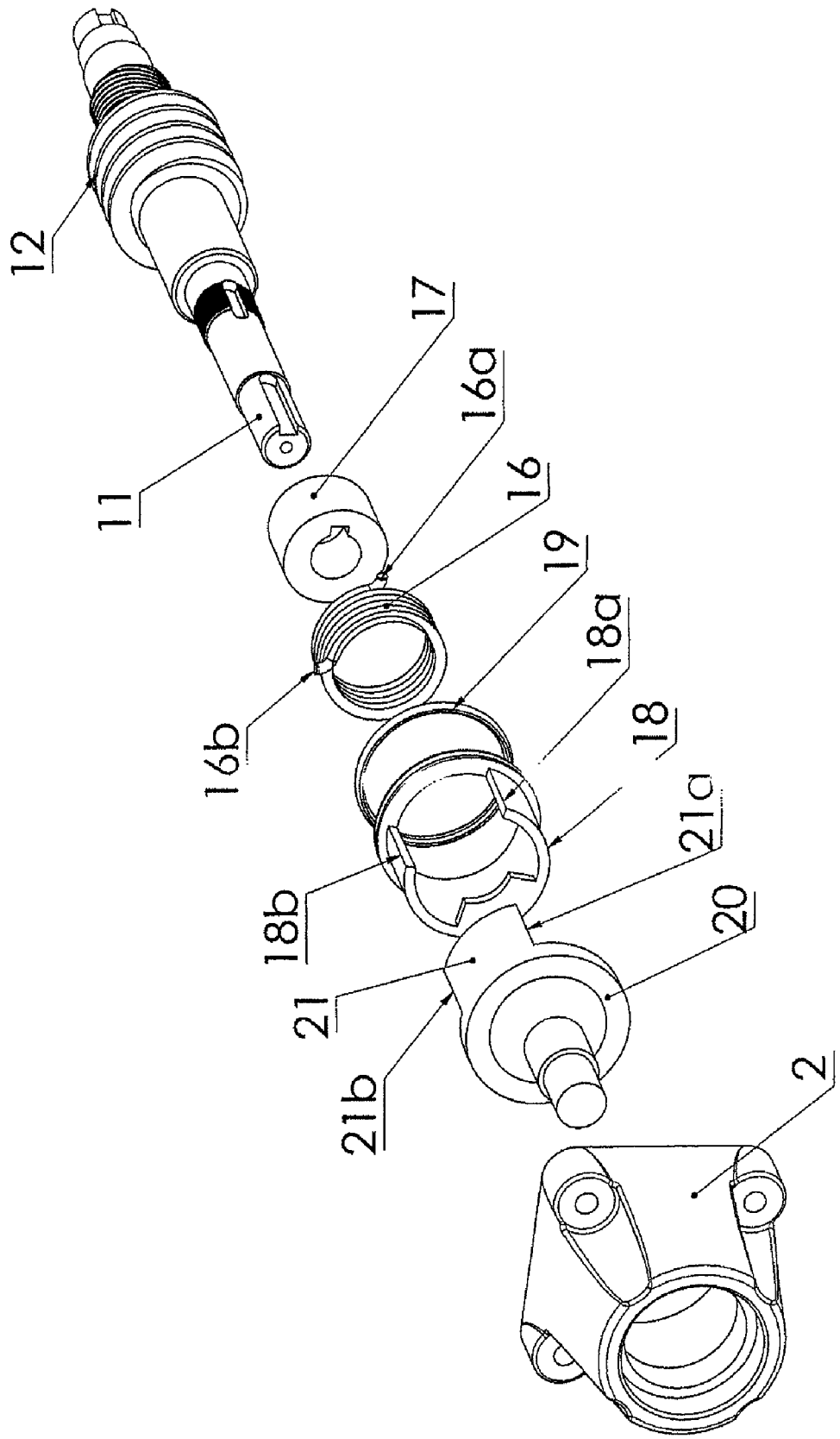

FIG. 3: an exploded view in perspective of a variant of the anti-backoff device of the invention.

The anti-backoff device according to the invention represented in FIG. 1 is included in an assembly comprising a casing (1) enclosing a servomotor and a reduction gear (not shown) driving a valve operating stem via a gearwheel meshing with a worm fixedly attached to the valve stem according to a known technique.

A cover (2) supporting a bearing is attached to the casing (1), if necessary by means of a cylinder (not shown), in order to protect the anti-backoff device (3) from the environment. The manual control handwheel (4) is mounted on the end (5) of the shaft of the movable part supporting the finger (6). The bearing of the cover (2) provides the retention of the shaft on which the handwheel is attached in a conventional manner, for example by means of a key interacting with a groove formed in the shaft.

The movable part supporting the operating finger (6) may pivot inside the cylindrical spring (7) with touching turns whose two ends (7a) and (7b) are curved inward. This cylindrical spring (7) is placed inside the ring (8) of the cylindrical bell housing (9). The internal diameter of the ring (8) is slightly less than the external diameter of the spring (7) in the unloaded state, such that the touching turns of the spring are pressed against the inner wall of the ring (8). The spring (7) is prestressed in order to be placed in the ring (8) and therefore exerts a load that is uniformly distributed over the inner wall of the ring.

The bell housing (9) comprises a central cylindrical sleeve (10) attaching it to the shaft (11) supporting the worm (12) by means of a key (13) represented in FIG. 2, interacting with a groove formed on the head of the shaft (11).

The spring (7) is chosen such that the sliding torque between its turns and the inner wall of the ring (8), which is a function of the diameter of the unloaded spring, its stiffness and its section, is greater than the torque to be transmitted by the handwheel (4) in normal operating conditions, such that the rotation of the operating finger (6) causes the rotation of the bell housing (9) by means of the spiral spring (7) locked against the inner wall of the ring (8) and fixedly attached to the latter.

Therefore, when the valve control is operated manually, by acting on the handwheel (4), the finger (6) pivots until it comes into contact against the outer curve of one or other of the ends (7a) and (7b) of the spring (7). The torque resulting from the action exerted on the handwheel (4) tends to cause the spring (7) to unwind and consequently to increase its diameter, further increasing the sliding torque between the spring and the ring (8), which has the effect of reinforcing the attachment of the spring and the ring. Therefore, the rotation of the handwheel causes the rotation of the spring and of the bell housing, which in its turn drives the worm acting on the valve stem.

When the valve control is actuated by the servomotor, the latter drives the worm (12) via its shaft (14) and the bell housing (9) and the spring (7) by means of the ring (8) because of the sliding torque between the spring and the ring. The spring rotates on its axis until the point of one of its ends (7a) and (7b), depending on the direction of rotation, butts against the release plate (15) which is clamped onto the bearing of the cover (2) by means of one or more seals of conventional type. These seals or shims make it possible to generate a sliding torque $C_1$ between the bearing (15b) and the release plate (15).

When the rotary movement continues, the torque exerted on the bent point of the end of the spring (7) tends to wind up the latter on itself, and consequently to reduce its diameter, until releasing the spring (7) from the ring (8). The ring and the worm (12) then continue to rotate under the action of the motor while the spring remains immobile.

The operating finger (6) is therefore not driven by the spring (7) and remains immobile, like the handwheel (4) to which it is fixedly attached.

The sliding torque $C_1$ between the release plate (15) and the bearing (15b) is adjusted such that it is always greater than the sliding torque $C_2$ between the cylindrical spring (7) and the bell housing (9). The result of this is that the release plate is fixedly attached to the bearing when the worm is driven by the motor.

Conversely, in manual control, the operating finger (6) acts on the curved ends (7a) and (7b) of the spring and may rotate the latter as soon as the torque $C_1$ is reached, preventing any blockage of the system.

In manual control, the release plate (15) may be rotated by the operating finger (6) by means of its bearing faces (15a) and (15b) situated in a plane outside the movement of the ends of the spring such that the ends of the spring can act only on the release plate (15) precisely.

FIG. 2 presents a section of the anti-backoff device of FIG. 1, the parts being mounted, at the base of the bell housing (9).

In the position shown, the anti-backoff device is not actuated, the operating finger (6) being substantially at an equal distance from the rounded bend of each of the ends (7a) and (7b) of the cylindrical spring (7). The stop of the release plate (15) is substantially equally distant from the ends of the spring, in a position opposite to that of the operating finger relative to the shaft.

FIG. 3 represents a variant of the sprung anti-backoff device of FIG. 1 in which the ends of the spring are curved outward, the operating mode then being different, but applying the same principle.

In this variant, the cylindrical spring (16) with touching turns comprises two ends (16a) and (16b) curved outward. It is mounted on a cylindrical support (17) such that its turns are in contact with the outer surface of the cylinder (17) in order to generate a friction torque when one of the parts is rotating relative to the other.

The cylindrical support (17) is mounted on the shaft (11) supporting the worm (12) by means of a key (13) interacting with two grooves formed, one on the head of the shaft (11), the other on the inner face of the support (17), as on the device of FIG. 1. It is therefore rotated by the servomotor.

The cylindrical support (17) and the spring (16) are placed in a seal-holder cylinder (18), clamped onto the casing of the servomotor (not shown) by means of an O-ring (19) and having the shape of a partially open cylinder. The ends (16a) and (16b) of the cylindrical spring (16) may move slightly in rotation with the spring, but their travel is limited by the edges (18a) and (18b) respectively formed along two generatrices of the seal-holder cylinder (18).

The other rotating part of the anti-backoff device is a drive cylinder (20) fixedly attached to the manual control handwheel of the valve. This drive cylinder comprises a strip (21) whose edges (21a) and (21b) interact with the curved ends (16a) and (16b) respectively of the spring (16). It is fixedly attached to the manual control handwheel (not shown) identical to that of FIG. 1.

The width of the cylindrical strip (21) is slightly less than the spacing between the two ends (16a) and (16b) of the spring (16) between which it is placed, such that a rotary movement of the drive cylinder (20) brings one or other of the edges of this strip (21) into abutment against the inside of the curve of the curved ends (16a) and (16b) of the spring.

When the mechanism is in motorized operation, the motor rotates the worm (12) and the cylindrical support (17). The spring (16), driven by the support (17), then comes into abutment by one or other of its ends (16a) and (16b) in the direction of rotation, against the edge (18a) or (18b) respectively of the fixed seal-holder (18) which generates a torque against the winding of the turns of the spring and causes the spring to unwind and increase its diameter, such that the spring is released from its support. The worm (12) then rotates freely without driving the spring, no more than the manual control handwheel.

On the contrary, when the manual control handwheel is actuated, one or other of the edges of the strip (21) of the drive cylinder (20), depending on the direction of rotation, acts on the inside of the curve of the curved end (16a) or (16b), in the winding direction, thereby accentuating the pressure of the turns on the cylindrical support, which makes it possible to drive the worm (12). In this variant, the seal-holder cylinder (18) plays the same role as the release plate (15) in the anti-backoff device of FIG. 1.

The invention claimed is:

1. Manual control motorized system comprising a mechanical sprung anti-backoff device, capable of fixedly immobilizing or releasing a manual control handwheel (4) and a motor acting on one and the same rotation shaft, comprising one cylindrical spring (7, 16) mounted in or on a cylinder (9, 17), said cylinder (9, 17) being mounted so as to rotate on the rotation shaft of said motor, and said spring being able to rotate with said cylinder, the turns of the spring being in contact with the inner or outer surface of the cylinder, wherein the ends (7a, 7b, 16a, 16b) of the spring (7, 16) are curved inward or outward, in a plane perpendicular to the axis of the spring, said handwheel (4) being capable of acting on the curve of one or other of the ends of the spring (7, 16) by means of an operating finger (6) or of a drive cylinder (20), and the rotation of the spring (7, 16) being limited by a stop acting against one or other of the ends (7a, 7b, 16A, 16b) of the spring.

2. The manual control motorized system according to claim 1, wherein the spring (7, 16) is a cylindrical spring with touching turns.

3. The manual control motorized system according to claim 2, wherein the spring (7, 16) comprises substantially square-section turns.

4. The manual control motorized system according to claim 1, wherein the two ends of the spring (7) are curved inward.

5. The manual control motorized system according to claim 4, wherein the curved ends (7a, 7b) of the spring (7) are situated substantially symmetrically on either side of a diametral plane of the spring (7).

6. The manual control motorized system according to claim 5, wherein diametral planes tangential to the curve of each of the two ends (7a, 7b) of the spring (7) form between them, an angle lying between 90° and 180° in which the operating finger (6) is placed, while a fixed release plate (15) is placed substantially symmetrically relative to the operating finger of shaft.

7. The manual control motorized system according to claim 1, wherein the operating finger (6) has a height and enters the inside of the spring (7), over the whole of the operating finger's height.

8. The manual control motorized system according to claim 1, wherein the two ends of the spring (16) are curved outward.

9. The manual control motorized system according to claim 8, wherein the cylinder (9, 17) in or on which the spring (16) is mounted, is situated in a cylinder (18) having two stops, each stop interacting with the outside of the curve of each of the curved ends of the spring.

10. The manual control motorized system according to claim 1, wherein the rotation shaft of said device acts on the opening and closing movement of a valve.

11. A mechanical sprung anti-backoff device, capable of fixedly immobilizing or releasing a manual control handwheel (4) and a motor acting on one and the same rotation shaft, comprising one cylindrical spring (7) mounted in or on a cylinder (9), said cylinder (9) being mounted so as to rotate on the rotation shaft of said motor, and said spring being able to rotate with said cylinder, the turns of the spring being in contact with the inner or outer surface of the cylinder, wherein the ends (7a, 7b) of the spring (7) are curved inward and the curved ends (7a, 7b) of the spring (7) are situated substantially symmetrically on either side of a diametral plane of the spring (7), said handwheel (4) being capable of acting on the curve of one or other of the ends of the spring (7) by means of an operating finger (6), and the rotation of the spring (7) being limited by a stop acting against one or other of the ends (7a, 7b) of the spring, and wherein diametral planes tangential to the curve of each of the two ends (7a, 7b) of the spring (7) form between them an angle lying between 90° and 180° in which the operating finger (6) is placed, while a fixed release plate (15) is placed substantially symmetrically relative to the operating finger (6).

12. The sprung anti-backoff device according to claim 11, wherein the operating finger (6) has a height and enters the inside of the spring (7), over the whole of the operating finger's height.

13. The sprung anti-backoff device according to claim 11, wherein the spring (7) is a cylindrical spring with touching turns.

14. The sprung anti-backoff device according to claim 11, wherein the spring (7) comprises substantially square-section turns.

* * * * *